United States Patent Office 3,115,416
Patented Dec. 24, 1963

3,115,416
METHOD FOR IMPROVING THE VISCOSITY OF NATURAL CLAYS
Roger Chavrier, Marseille, France, assignor to Societe Francaise des Glycerines, Paris, France, a corporation of France
No Drawing. Filed Jan. 23, 1961, Ser. No. 83,880
Claims priority, application France Feb. 9, 1960
2 Claims. (Cl. 106—72)

The essential qualities which are required in order that a clay may be suitable for various industrial applications are especially the viscosity and the stiffness of the gels which are obtained by its aid.

This is particularly the case with the preparation of drilling sludges in searching for hydrocarbons, natural gas, etc., for the accomplishment of fluid-tight sealing, the agglomeration of foundry sands, etc. Other subsidiary properties must also be considered, such as the binding, emulsifying, absorbent, adhesive and swelling properties of the clays employed.

In practice, there exist very few natural deposits of clays which have the requisite qualities. The most suitable are those known as "sodium bentonites," of which the deposits are very few and these are often far distant from the points of utilization. Use must therefore be made of other natural clays with a base of alkaline-earth bentonites which are treated in order to render them suitable for the purposes contemplated, so as to convert them to artificial sodium bentonites by the action of alkaline salts such as sodium carbonate.

This conversion, which may be termed bentonification, must be attributed to the exchange of the exchangeable calcium cations of the crude clay with sodium cations, as in natural bentonite. This interchange $Ca^{++} \rightleftarrows Na^{+}$ enables the viscosity of the clay to be increased from a value of 60 in the Stormer scale to a value of 130 and even more, and very rarely reaches 200 and 300 (measured on 5% gels).

It will be recalled that the value of the Stormer viscosity is an empirical and comparative measure supplied by the Stormer viscosity meter. This apparatus is composed of a small tank receiving the clay gel to be measured, and in which revolves a rotor driven by variable weights. The Stormer viscosity is expressed in grams by the weight necessary to produce 100 revolutions of the rotor in 10 seconds. It can be expressed in centipoises when the apparatus has been suitably calibrated.

By the 5% gel on which the measurements are made is meant a suspension of 5% of clay in water prepared in a mixer.

While the improvement of the qualities of the clay by bentonification is appreciable, it remains inadequate to comply with all the requirements of practical use, which sometimes necessitate much higher viscosities, exceeding a value of 250 on the Stormer scale, which corresponds to about 80 centipoises.

On the other hand, in order to improve the qualities of natural clays, it has already been proposed to add to them alkaline or alkaline-earth oxides or hydroxides, and in particular magnesia. However, this addition made to crude, non-bentonified clay does not give appreciable results and does not give the increase in viscosity required to correspond to the necessary values indicated above.

The present invention has for its object a process enabling this problem to be resolved and, starting from bentonite or natural clays already treated and bentonified, permitting their viscosity to be further increased up to the desired value and simultaneously improving their other qualities for industrial use.

This method is characterized in that there is associated with a bentonification by exchange of ions in one single operation, an addition of magnesium oxide in powder form, in the proportion of 0.25 to 3%.

Experience has shown that the addition of these compounds to clay in a proportion of 0.25 to 3% by weight of the clay, and preferably from 0.25 to 1%, gives it a large increase in viscosity which can easily be brought up to 300 grams Stormer and can even attain values of 500 to 1,000 grams Stormer, the measurements being made on 5% gels. The treatment according to the invention thus constitutes a "super-bentonification" of the clay.

It should be observed that this treatment with increase in viscosity improves other properties of clays such as swelling. On the other hand, it has no influence on the A.P.I. filtrate (drilling sludges).

These properties give the clay thus treated, so to speak "super-bentonified" qualities which are extremely valuable for its industrial uses, for drilling sludges, sealing, as an agglomerant of foundry sands, etc.

In particular, the gradual nature of the increase in viscosity makes it possible to pump the suspension at the moment when it has just been prepared. When the suspension is in position, the viscosity increases until it has the appearance of a setting phenomenon. This property is used to advantage for the purposes of fluid-tight sealing, amongst other purposes for closing drilling holes.

One way of carrying the method into effect consists in humidifying the mixture of clay and its additions, both of salts which ensure the exchange of ions, and of magnesia and then in effecting the pressing of this mixture and drying it. This method of operation will be illustrated by the examples below.

In these examples are given the values of the stiffness of the bentonized gel (gel 0 and gel 10), of the Stormer viscosity, of the swelling and of the filtrate.

The Stormer viscosity has been defined above. The gel 0 is that which is obtained immediately after a vigorous stirring. The gel 10 is that which is observed after a period of rest of 10 minutes. The values indicated below, expressing the stiffness of the gels 0 and 10, are those supplied by the Stormer viscosity meter. The difference between the values existing between the gel 10 and the gel 0 represents the thixotropy.

The swelling represents the capacity of the clay in absorbing water. It is measured by the ratio of the apparent volume of the clay after swelling in water to the initial volume of the dry clay.

The filtrate which expresses the blocking or sealing power of a clay is measured with a filter press, for example of the Baroid type. This apparatus is filled with a 5% clay gel for example and the volume of the filtrate in 30 minutes is measured, with an applied pressure of 7 kgs. per sq. cm.

All the figures given were measured on 5% gels.

*Example 1*

A calcium bentonite A is treated simultaneously with sodium carbonate and calcined caustic magnesia. For this purpose, 4% of sodium carbonate plus 0.25 to 1% of magnesium oxide in powder form are added to the crushed clay. The mixture of the three constituents is then moistened with 10 to 20% of water and is passed into an extrusion press in which the bentonification and the superbentonification take place simultaneously.

After drying in a tunnel-oven, the product is crushed to 200 screen.

In this method of operation, there is observed a considerable increase in the viscosity and the stiffness, which increases as the quantity of magnesia added is increased.

The results obtained are indicated in the following table.

| Treatment of clay | First measurements ||| Measurement after 24 hours ||| Swelling | Filtrate, cc. |
|---|---|---|---|---|---|---|---|---|
| | Gel 0 | Gel 10 | Viscosity in Stormer grams | Gel 0 | Gel 10 | Viscosity | | |
| Usual bentonification with 4% of Na₂CO₃ | 35 | 130 | 95 | 50 | 130 | 155 | 22 | 14 |

METHOD OF OPERATION ACCORDING TO THE INVENTION

| | | | | | | | | |
|---|---|---|---|---|---|---|---|---|
| Simultaneous treatment of clay by Na₂CO₃ and MgO: | | | | | | | | |
| 4% Na₂CO₃+0.5% MgO | 70 | 190 | 185 | 100 | 190 | 210 | | |
| 4% Na₂CO₃+0.75% MgO | 180 | 220 | 360 | 190 | 210 | 300 | | |
| 4% Na₂CO₃+1% MgO | 340 | 340 | 500 | 340 | 300 | 500 | | |

*Example 2*

An alkaline-earth bentonite B (exchangeable Ca—Mg cations) was treated in accordance with the method of Example 1 and gave the following results:

| Treatment of clay | First measurements ||| Measurement after 24 hours ||| Swelling | Filtrate, cc. |
|---|---|---|---|---|---|---|---|---|
| | Gel 0 | Gel 10 | Viscosity | Gel 0 | Gel 10 | Viscosity | | |
| Usual bentonification with 4% of Na₂CO₃ | 10 | 30 | 70 | 15 | 40 | 90 | 13 | 16 |

METHOD OF OPERATION ACCORDING TO THE INVENTION

| | | | | | | | | |
|---|---|---|---|---|---|---|---|---|
| 0.25% MgO | 30 | 50 | 90 | 45 | 60 | 110 | 14.5 | 16 |
| 0.35% MgO | 45 | 80 | 110 | 50 | 90 | 125 | 15 | 16 |
| 0.5% MgO | 50 | 100 | 135 | 85 | 80 | 180 | 11.4 | 17 |
| 0.75% MgO | 70 | 110 | 130 | 80 | 95 | 170 | 10 | |

What I claim is:

1. A method of increasing the viscosity of calcium bentonite in the form of powder, comprising mixing with said calcium bentonite about 4% by weight of sodium carbonate and 0.25% to 3% by weight of powdered magnesium oxide, adding to the resultant mixture about 10% to 20% by weight of water, pressing the mixture, and then drying the pressed mixture.

2. A method of increasing the viscosity of a powdered, alkaline-earth bentonite selected from the group consisting of calcium bentonite and calcium-magnesium bentonite, comprising mixing with said bentonite about 4% by weight of sodium carbonate and 0.25% to 3% by weight of powdered magnesium oxide, adding to the resultant mixture about 10% to 20% by weight of water, pressing the mixture, and drying the pressed mixture.

References Cited in the file of this patent

UNITED STATES PATENTS 2,393,174    Larsen            Jan. 15, 1946